US009237823B2

(12) United States Patent
Ozanne et al.

(10) Patent No.: US 9,237,823 B2
(45) Date of Patent: Jan. 19, 2016

(54) BEVERAGE PRODUCTION SYSTEM USING CAPSULES

(75) Inventors: Matthieu Ozanne, Champanges (FR); Didier Vuagniaux, Gimel (CH)

(73) Assignee: Nestec S.A., Vevey (CH)

( * ) Notice: Subject to any disclaimer, the term of this patent is extended or adjusted under 35 U.S.C. 154(b) by 192 days.

(21) Appl. No.: 13/698,585

(22) PCT Filed: May 9, 2011

(86) PCT No.: PCT/EP2011/057423
§ 371 (c)(1),
(2), (4) Date: Nov. 16, 2012

(87) PCT Pub. No.: WO2011/144479
PCT Pub. Date: Nov. 24, 2011

(65) Prior Publication Data
US 2013/0064948 A1 Mar. 14, 2013

(30) Foreign Application Priority Data

May 19, 2010 (EP) .................................... 10163329

(51) Int. Cl.
*A47J 31/40* (2006.01)
*A47J 31/36* (2006.01)

(52) U.S. Cl.
CPC .......... *A47J 31/3638* (2013.01); *A47J 31/3628* (2013.01); *A47J 31/3633* (2013.01); *A47J 31/407* (2013.01)

(58) Field of Classification Search
CPC . A47J 31/3633; A47J 31/407; A47J 31/3695; A47J 31/3628
USPC ............................... 99/295, 302 P, 289 R, 297
See application file for complete search history.

(56) References Cited

U.S. PATENT DOCUMENTS 5,755,149 A * 5/1998 Blanc et al. .................. 99/289 T
6,026,732 A 2/2000 Kollep et al.
(Continued)

FOREIGN PATENT DOCUMENTS

| CN | 101516744 | 8/2009 |
| CN | 102933127 | 2/2013 |

(Continued)

OTHER PUBLICATIONS

International Search Report for International Application No. PCT/EP2011/057423 with a Date of mailing of Nov. 18, 2011—3 pages.
Written Opinion of the International Searching Authority on International Application No. PCT/EP2011/057423 with a Date of mailing of Nov. 18, 2011.

*Primary Examiner* — Reginald L Alexander
(74) *Attorney, Agent, or Firm* — K&L Gates LLP

(57) ABSTRACT

The invention concerns a beverage production system comprising a capsule (1) and a module (2) for producing a beverage from the capsule, the capsule (1) comprising an enclosure (1a) and a rim (1b), and the module (2) comprising: a first capsule engagement member (3), which can be displaced relative to a second, co-operating capsule engagement member (4) between a capsule discharge position and a beverage production position, the displaceable first capsule engagement member (3) comprising member (13) having the shape of a hollow bell, and the capsule (1) presenting an enclosure outer shape that is conformal to at least a portion of the hollow bell shaped member (13) and the capsule presenting a rim (1b) size such that at least a part of the rim of the capsule extends beyond at least a part of the first capsule engagement member (3) once it is engaged in the first capsule engagement member, wherein the displaceable first capsule engagement member (3) comprises retaining means able to create friction with discrete parts of the outer shape of the enclosure (1a) of the capsule, and wherein the module (2) comprises means for engaging the rim (1b) of the capsule extending beyond the first capsule engagement member when the first capsule engagement member (3) is displaced from the beverage production position to its opened capsule-insertion position.

9 Claims, 9 Drawing Sheets

(56) References Cited

U.S. PATENT DOCUMENTS

| | | | |
|---|---|---|---|
| 6,880,454 B2 * | 4/2005 | Kollep | 99/295 |
| 7,350,456 B2 * | 4/2008 | Blanc et al. | 99/302 P |
| 7,993,691 B2 * | 8/2011 | Yoakim et al. | 426/77 |
| 8,079,300 B2 | 12/2011 | Jing | |
| 8,210,096 B2 | 7/2012 | Fin | |
| 2008/0141865 A1 | 6/2008 | Bardazzi | |
| 2010/0037779 A1 * | 2/2010 | Pecci et al. | 99/289 R |
| 2011/0097463 A1 | 4/2011 | Deuber | |

FOREIGN PATENT DOCUMENTS

| | | |
|---|---|---|
| EP | 2033551 | 3/2009 |
| EP | 2105074 | 9/2009 |
| WO | 2005058111 | 6/2005 |

* cited by examiner

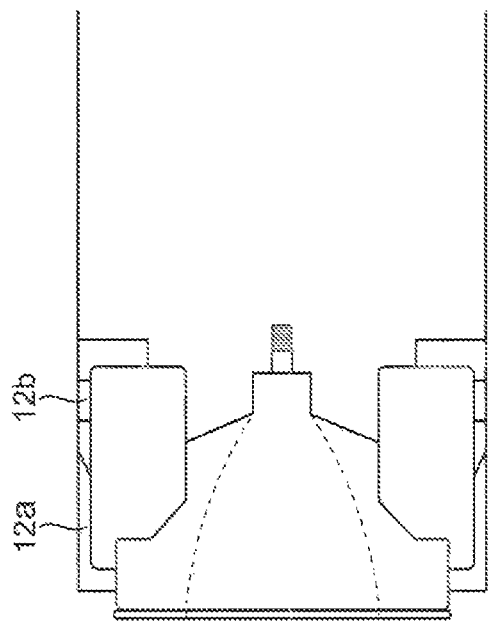
FIG. 7a
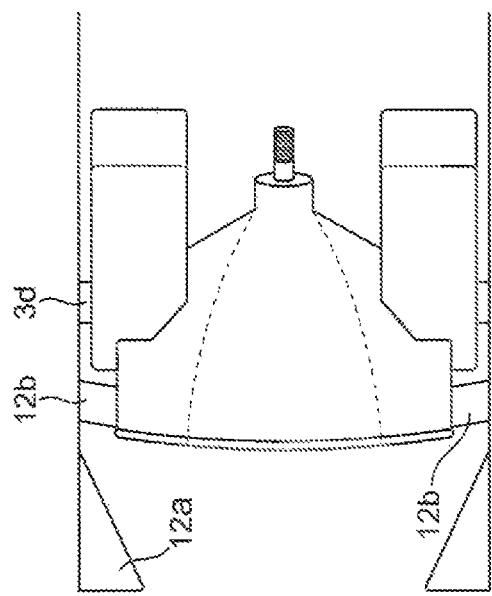
FIG. 7b
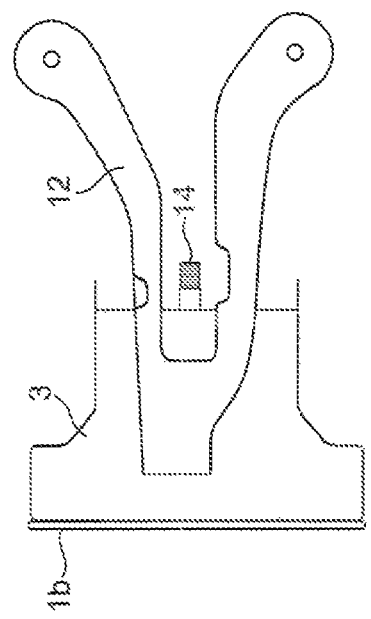
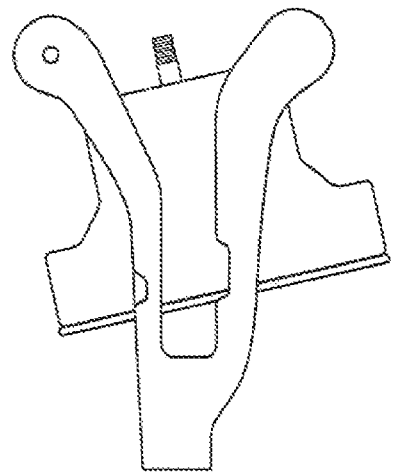

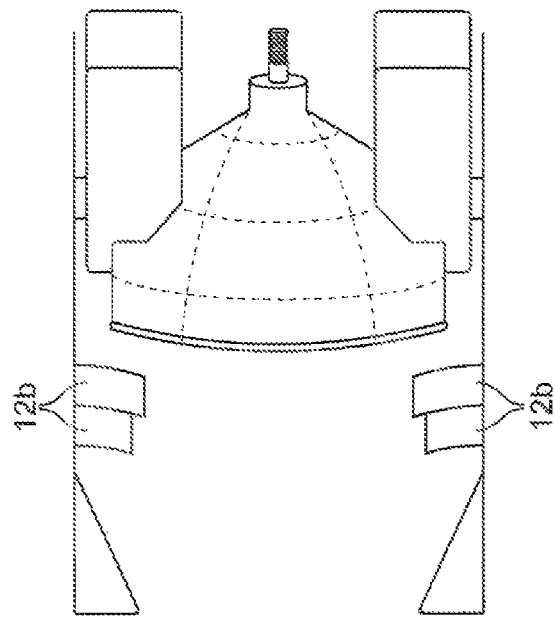
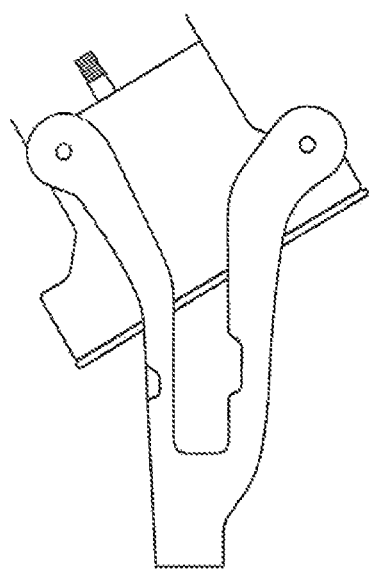
FIG. 7c

BEVERAGE PRODUCTION SYSTEM USING CAPSULES

CROSS REFERENCE TO RELATED APPLICATIONS

The present application is a National Stage of International Application No. PCT/EP2011/057423, filed on May 9, 2011, which claims priority to European Patent Application No. 10163329.5, filed on May 19, 2010, the entire contents of which are being incorporated herein by reference.

The present invention relates to the field of producing beverages or other liquid comestibles on the basis of ingredients which are contained in a capsule.

The capsule is inserted into the beverage production module of a beverage production machine. The module is designed to inject a liquid such as for example hot water into the capsule in order to have the liquid interacts with the ingredients contained in the capsule. Note that some beverage production techniques ask for a pressurized injection like coffee beverage, others such as e.g. brewing tea can be made at ambient pressure. The invention can find application in both scenarios. The result of the interaction, i.e. the produced beverage or liquid comestible, is then drained from the capsule and fed to a receptacle such as e.g. a cup placed below an outlet for the beverage.

The invention relates particularly to beverage production machines comprising a module with a first capsule engagement member, which can be displaced relative to a second co-operating capsule engagement member between an opened capsule insertion position and a closed capsule-enclosure position. The module comprises means for actively retracting the capsule from the beverage production position to a capsule discharge position in which the capsule is discharged from the module. Such a machine presents the advantage of having a capsule discharge position which is offset relative to the beverage production position. This advantage is of interest when the machine and the capsule are conceived for delivering the beverage directly out of the capsule in a cup without the beverage contacting the machine since it enables the discharge of the capsule in a position which is offset relative to the vertical of the beverage flow path. Such a beverage production machine is described in EP-A1-2 033 551.

In such a machine, the capsule is introduced in the beverage production module, retains by pre-fixation arms in a pre-engagement position and then engaged by a first engagement member that is conformal to the capsule shape further to the movement of the first engagement member to the capsule. At the end of this movement, the capsule is clamped between the first and the second engagement members and the diluent, generally water, can be introduced to interact with the ingredients in the capsule. The resulting beverage flows out of the capsule either through en outlet provided in the capsule or/and produced by the machine during the capsule engagement and falls by gravity in a cup. Once the beverage has been delivered, the first engagement member moves back to the capsule discharge position dragging the capsule towards a position offset relative to the vertical of the beverage flow path. The movement of the first engagement member is a combination of a linear movement and an end swivelling movement so that the capsule can fall by gravity from the first engagement member.

Yet it has been noticed that the end swivelling movement is not systematically sufficient to make the capsule drop from the first engagement member to a capsule recovery container, particularly if the consumer has not discharged the capsule immediately after having prepared a beverage. In this situation it has been noticed that the capsule can stick to the first engagement member and that the capsule does not disengage which blocks the machine.

Besides such a machine comprises in its first capsule engagement member a hollow needle for opening the capsule and injecting water in the capsule. According to an embodiment this needle is retractable and the retraction can help in ejecting the capsule from the first engagement member at the capsule discharge position. But according to another embodiment, the needle is not retractable and continuously protrudes in the first capsule engagement member and in the capsule. This needle may retain the capsule in the first engagement member in spite of the swivelling movement and may prevent the discharge of the capsule from the beverage production module, which would block the machine.

The invention now targets at a reliable discharge of the capsule from such a beverage production machine, particularly the machine described in EP-A1-2 053 551.

This object is achieved by means of specific features of the machine and the capsules. This system comprising these both objects guarantees a systematic efficient discharge of the capsule from the capsule engagement member.

The invention concerns a beverage production system comprising a capsule and a module for producing a beverage from the capsule, the capsule comprising an enclosure and a rim, and
the module comprising:
 a first capsule engagement member, which can be displaced relative to a second, co-operating capsule engagement member between a beverage production position and a capsule discharge position,
 means for actively retracting the first capsule engagement member from the beverage production position to the capsule discharge position in which the capsule is discharged from the first capsule engagement member and which is offset relative to the vertical of the beverage flow path, the displaceable first capsule engagement member comprising an element having the shape of a hollow bell member and the capsule presenting an enclosure outer shape that is conformal to at least a portion of the hollow bell member and the capsule presenting a rim size such that at least a part of the rim of the capsule extends beyond at least a part of the first capsule engagement member once engaged in the first capsule engagement member, wherein the displaceable first capsule engagement member comprises retaining means able to create friction with discrete parts of the outer shape of the enclosure of the capsule, and wherein the module comprises means for engaging the rim of the capsule extending beyond the first capsule engagement member when the first capsule engagement member is displaced from the beverage production position to its capsule discharge position.

The module for producing a beverage of the system can present the features of the module described in EP-A1-2 053 551. It comprises two co-operating capsule engagement members, the first member being displaceable between a closed position in which the capsule is engaged between the two members and called the beverage production position and an open position in which no capsule is engaged by the members and called the capsule discharge position. According to the invention the capsule discharge position is offset relative to the vertical of the beverage flow path that is to the beverage production position.

The module comprises means for displacing the first capsule engagement member between the two positions.

Generally the module is designed for injecting water into the capsule and draining the beverage from the capsule while the capsule is in the beverage production position.

The capsule of the system of the present invention comprises an enclosure in which beverage ingredients are contained. These ingredients can be for example selected in the following list: tea leaves, herbal or fruit tea leaves, roast and ground coffee, soluble beverage ingredients, . . . . The enclosure is usually a cup-shaped housing which can encompass different cross sections such as triangular, circular, ellipsoid, egg-shaped, square, rectangular or polygonal section. The enclosure is usually closed by a cover, preferably a plane cover. The capsule of the present invention also presents a rim at the edge of the enclosure. The cover can be fixed on this rim. The capsule is preferably made of a material sufficiently rigid (either due to its nature or to its thickness) so that it is not deformed by the friction means of the first capsule engagement member when it is engaged in said member. Otherwise the friction force could not be sufficiently strong to retain the capsule during the movement of the first capsule engagement member.

According to the invention the displaceable first capsule engagement member comprises an element having the shape of a hollow bell member and the capsule presents an enclosure outer shape that is conformal to at least a portion of said hollow bell member. By "conformal", it is meant that the capsule outer shape is defined in order to match at least a portion of the hollow bell shape outer shape. Thus at least a part of the outer contour of the capsule can be housed in the hollow bell member.

Besides the capsule presents a rim size such that at least a part of the rim of the capsule extends beyond the first capsule engagement member once it is engaged in the first capsule engagement member.

According to the invention the displaceable first capsule engagement member comprises retaining means able to create a friction with discrete parts of the outer shape of the enclosure of the capsule. These retaining means can be friction means that exerts a friction on the capsule enclosure outer wall when it is engaged in the first capsule engagement member. These retaining means are preferably positioned inside the hollow bell member of the first engagement member According to a preferred embodiment the retaining means that engage discrete parts of the periphery of the outer shape of the enclosure of the capsule are discrete bumps placed on the internal surface of the hollow bell member of the first capsule engagement member. Preferably the bumps are made of a flexible and resilient material. The material can be elastomeric, for example a silicone rubber or an EPDM (ethylene propylene diene monomer) rubber.

If the capsule section presents a symmetrical shape, the bumps are preferably placed by pairs at the internal surface of the hollow bell member and the two bumps of a pair are symmetrically opposed in view of the symmetrical plane or axis of the capsule when it is engaged in the first capsule engagement member. Then each pair of bumps forms a sort of pair of pliers that maintains and retains the capsule in the first capsule engagement member when this member moves back to the capsule discharge position.

Even more preferably, if the capsule presents a vertical plan of symmetry in its extracting position then the first engagement member can comprise four bumps, the first pair being vertically opposed along the plane of symmetry and the second pair being horizontally opposed in view of the plan of symmetry.

According to the invention the module comprises also means for engaging the rim of the capsule that extends beyond the first capsule engagement member when the first capsule engagement member is displaced from the beverage production position to its capsule discharge position. This means can simply be a tab extending from the housing of the beverage machine supporting the module.

Preferably in the module of the system of the present invention the means for actively retracting the first capsule engagement member from the beverage production position to the capsule discharge position are designed to implement the combination of a linear movement and a swivelling end movement.

Usually the first capsule engagement member comprises opening means for piercing the capsule and injecting water in the capsule. The opening means can be a hollow needle linked to water supply.

Preferably the module of the system of the present invention comprises pre-fixation means which are provided at a lateral side of the capsule and designed to engage with the rim of the capsule for fixation of the capsule close to the second engagement member before the beverage production.

The module can comprise means for opening the cover. These means are generally placed adjacent to the second capsule engagement member or can even be part of this second capsule engagement member.

BRIEF DESCRIPTION OF THE DRAWINGS

The characteristics and advantages of the invention will be better understood in relation to FIG. 1a-1c show a sequence for illustrating the transfer from a capsule insertion state, (FIG. 1a) to a beverage production position (FIG. 1c) with a beverage machine in which the system of the present invention can be implemented.

FIGS. 7a-7c illustrate the relative positions of first capsule engagement member, the capsule and the pre-fixation means during the movement of the first capsule engagement member from the beverage production position (FIG. 7a) to the capsule discharge position (FIG. 7c) according to a second embodiment.

DETAILED DESCRIPTION OF THE DRAWINGS

Figure 1:
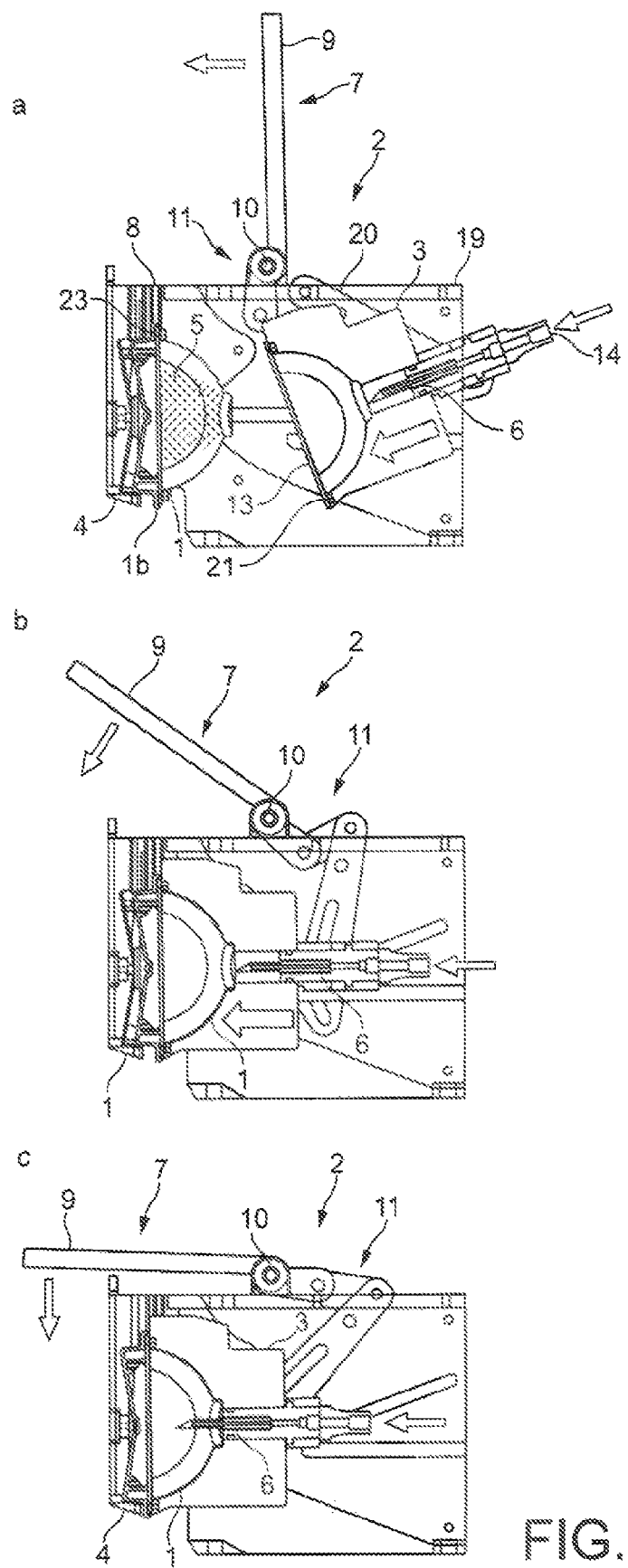

Throughout the figures only the beverage production module 2 of a beverage production machine is shown. Usually the beverage production module 2 is supplied with a liquid at a liquid inlet 14 which can be in fluid connection with means for heating and/or pressurizing the supplied liquid. At the outlet side, means for guiding a produced beverage or liquid comestible to a designated outlet of the beverage production machine can be provided. The beverage production module 2 as shown in the figures is preferably housed in a casing of the beverage production machine such that it assumes an essentially horizontal position.

FIG. 1*a* shows a state of the beverage production module 2 in which a capsule 1 being at least partially filled with ingredients 5 can be inserted from the top through an opening (slot) 8 of a casing 19 of the beverage production module 2. FIG. 1*a* shows the state in which the capsule 1 has been already manually inserted by a user from the top through the opening 8 into the interior of the casing 19 of the beverage module 2. Preferably in the state as shown in FIG. 1*a* the capsule 1 is held by pre-fixation means which will be explained later on in detail referring to FIGS. 6 and 7. As can be seen in FIG. 1*a*, in this pre-fixation position the capsule 1 is preferably held in an essentially vertical orientation, i.e. the symmetrical axis of the capsule is essentially horizontal. Other pre-positioning arrangements of the capsule 1 can be thought of in which the capsule 1 is held in an orientation which forms a small (acute) angle vis-à-vis the vertical axis. In the state as shown in FIG. 1*a* the capsule is pre-fixed close to a second engagement member 4 which can comprise means for opening (perforating, etc.) the face of the capsule adjacent to the second engagement member 4. This second engagement member 4 can also comprise means for or guiding a produced beverage or liquid comestible from the capsule 1 to a cup. The first engagement member 3 is in an opened state, i.e. as controlled by a manual actuator mechanism in the capsule insertion state as shown in FIG. 1*a*, the first capsule engaging member 3 is distanced from the second engagement member 4, wherein this distance is substantially larger than the corresponding dimensions of the capsule 1. According to a preferred aspect which will be explained in detail later on, optionally the first engagement member 3 is not only distanced from, but also slightly rotated vis-à-vis the main plane formed by the second engagement member 4.

In the embodiment of FIG. 1 the first engagement member 3 is provided with capsule opening means, which can be perforation means such as a hollow needle 6. In FIG. 1*a* the perforation means 6 are in a position in which they are retracted such that they do not protrude into a half dome formed by a hollow bell member 13 of the first engagement member 3. According to the preferred embodiment (not illustrated in FIG. 1) the perforation means 6 are not retractable but fixed in the first engagement member 3. The hollow bell member 13 has an essentially matching shape to the contour of the capsule 1. The rear end of the first engagement member 3 is provided with a liquid supply 14 which is in fluid connection with the hollow needle (perforation member) 6.

The first engagement member 3 is connected to an actuator mechanism 7. According to a first embodiment the actuator mechanism 7 comprises a manually operable lever handle 9 and the first engagement member 3 is connected to the lever handle 9 by means of a knee-joint mechanism 11 which can preferably comprise several axis 10 and intermediate levers 20. The actuator mechanism 7 is designed to control the displacement of the first engagement member 3 and optionally the displacement of the perforation member 6. Note that alternatively or additionally an electric actuator can be used. By operating the lever handle 9 of the actuator mechanism 7, the first engagement member 3 can be transferred into an intermediate stage as shown in FIG. 1*b*. The intermediate stage as shown in FIG. 1*b* is characterized in that the hollow bell member 13 has essentially fully engaged the outer contour of the capsule 1, while the hollow needle (perforation member) 6 is still in its retracted position vis-à-vis the bell member 13 and correspondingly the perforation member 6 is not yet interfering with the capsule 1. If the hollow needle is not retractable, the capsule has been already pierced by the needle in this position. Now, when turning the lever handle 9 further in the anti-clockwise direction, the beverage production module 2 can be transferred from the intermediate stage as shown in FIG. 1*b* to a final closure state as shown in FIG. 1*c*. The final closure state as shown in FIG. 1*c* is characterized in that the hollow bell member 13 still fully engages the capsule 1, however, also mechanically controlled by manipulating the actuator mechanism 7, the perforation member 6 has been actively pushed from its retracted position (FIG. 1*a*, 1*b*) to a protruding position as shown in FIG. 1*c*. By being actively moved from the retracted position to the protruding position as shown in FIG. 1*c*, the perforation member 6 will perforate the associated face of the capsule 1 and will at least partially protrude into the interior of the capsule 1, except if this perforation member is not retractable, in which case the capsule has been already pierced by the needle.

In this state the liquid supplied to the liquid supply 14 of the first engagement member 3 can be injected into the interior of capsule 1 through the perforation member 6. Thus, in the state as shown in FIG. 1*c* the injected liquid can be made to interact with the ingredients of the capsule 1 in order to produce a beverage or another liquid comestible.

During the transition from the capsule insertion state of FIG. 1*a* to the final closure state as shown in FIG. 1 *c*, the first capsule engagement member 3 has been moved along a composite trajectory vis-à-vis the second engagement member 4. The composite trajectory preferably comprises a rotational movement at the beginning in order to align the front contour 21 of the first engagement member 3 with the vertical plane of the second engagement member 4. Both in the intermediate stages shown in FIG. 1*b* and the final closure state as shown in FIG. 1*c* the capsule 1 is held safely in a defined position by having a flange-like rim portion 1*b* of the capsule being clamped between the rim of the front contour 21 of the first engagement member 3 and in associated clamping surface 23 of the second engagement member 4.

Preferably the perforation position of the capsule 1 also corresponds to the beverage production position in which the liquid is injected into the capsule 1.

FIGS. 2*a* to 2*e* essentially show the same transition from the capsule insertion state of the beverage production module 2 to the final closure state of FIG. 2*c*, which is only also the beverage production state of the beverage production module 2. After the end of the beverage production, the actuator means 7 can again be manually and/or electrically operated in order to transfer the beverage production module 2 back to the opened capsule insertion state (FIG. 2*e*).

Figure 2:
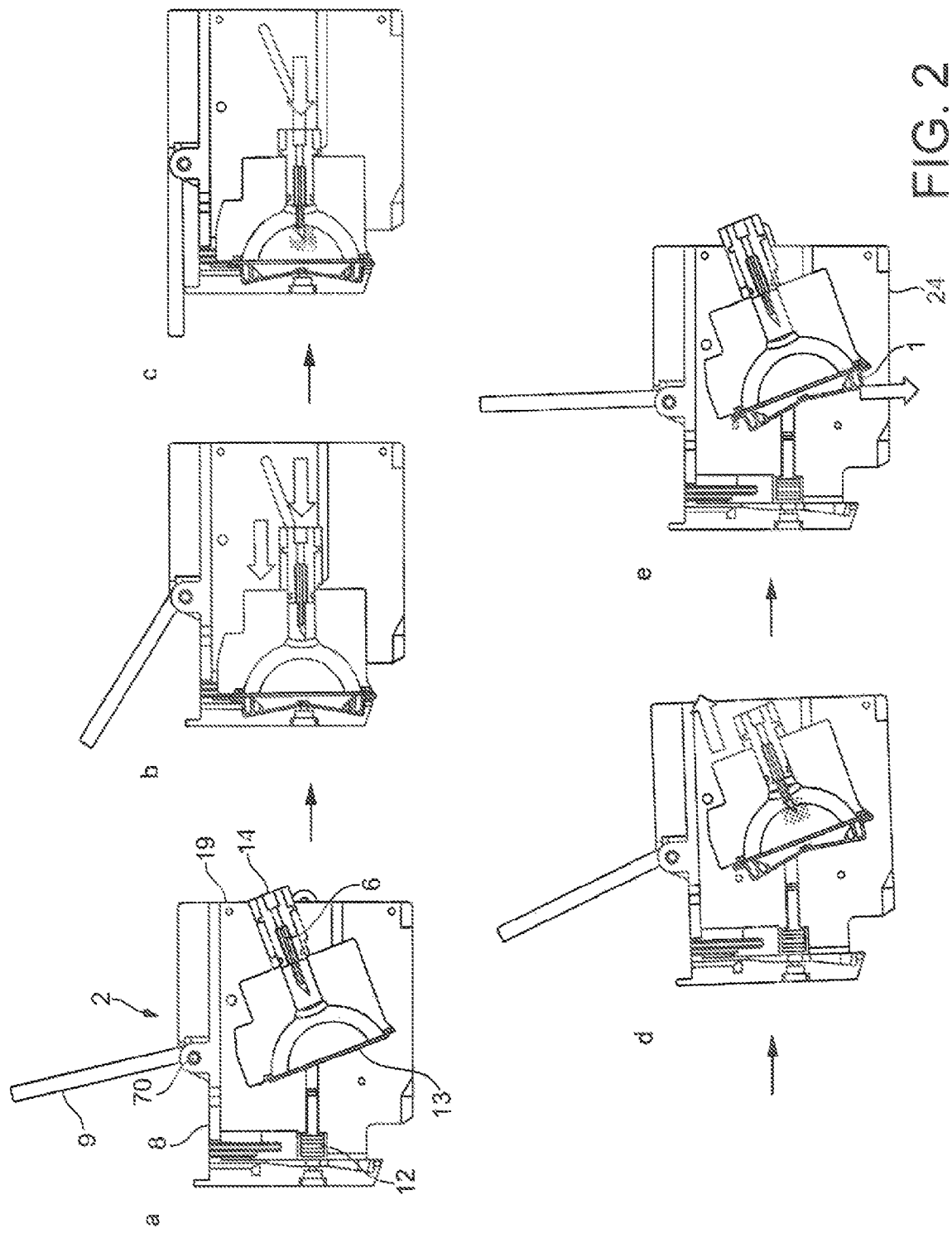
FIG. 2a-2e show the complete cycle for transferring a beverage production module that can be implemented according to the present invention from a capsule insertion state (FIG. 2a) to a capsule production position (FIG. 2c) and to the capsule discharge position (FIG. 2e).

As it is shown in FIG. 2*d* and FIG. 2*e*, when manually moving the lever handle 9 of the actuator mechanism 7 in the clockwise direction of the embodiment of FIG. 2, in a first step the first engagement member 3 is linearly retracted and distanced from the second engagement member 4. The holding-back function of the perforation member 6 of the first engagement member 3 leads to a separation of the capsule 1 from the second capsule engagement member 4.

Starting from the intermediate state as shown in FIG. 2*d* the first engagement member 3 is controlled to carry out a swivelling movement. During the final transition to the capsule insertion state as shown in FIG. 2*e* the perforation member 6 is finally made to be retracted from the hollow bell member 13. The capsule 1 which has been hitherto retained by the frictional engagement with the perforation member 6, will drop from the first capsule engagement member 3 and will be discharged from the beverage module 2 through an opening 24 at the lower side of the beverage production module 2. Thus, the swivelling movement at the end of the trajectory of the first capsule engagement member 3 facilitates the discharge of the capsule 1 in the retracted position e.g. towards a waste container placed inside the beverage production machine and below the beverage production module 2.

Yet where the opening member 6 is not retractable from the hollow bell member 13, the swivelling movement may not be sufficient to discharge the capsule 1, particularly if the customer has not discharged the capsule immediately after the beverage production step: some residues of the beverage may escape from the capsule through the hole pierced by the opening member 6, dry and stick the capsule external surface to the hollow bell member 13.

As shown in FIG. 7, the actuator mechanism 7 comprises a lever handle 9 acting on a knee-joint mechanism 11, wherein the extremity of the actuator mechanism 7 being at the opposite end of the lever handle 9 comprises a first control curve 17. This first control curve 17 cooperates with a guiding pin 16 which is fixed to the lateral side of the first capsule engagement member 3. Therefore, the cooperation of the first guiding curve 17 with the guiding pin 16 is designed to selectively displace the first engagement member 3, to which is also fixed the perforation member 6 linked to the diluent supply 14. The first guiding curve 17 is essentially composed of a first linear section 29 and a second linear section 30, being shorter than the first linear section 29 and forming an obtuse angle vis-à-vis the first linear section 29. When starting from the capsule insertion position (level 9 in vertical position) the guiding pin 16 is made to cooperate with the first linear section 29 which is designed to linearly and integrally displace the first engagement member 3. On the other hand, in the final phase, i.e. when the first engagement member 3 approaches the beverage production state (level 9 in horizontal position), the guiding pin 16 is made to cooperate with the second linear section 30 of the guiding curve 17. The guiding pin 16 is also made to cooperate with a second guiding curve 18 provided in the lateral walls of the casing 19 of the beverage production module 2. The second guiding curve 18 is composed of at least two different segments, such as for example an essentially horizontal linear segment 21 and an inclined linear segment 20 being raised to the rear end of the module. Due to the cooperation of the guiding pin 16 with this particular design of the second guiding curve 18, the first engagement member 3 carries out an essentially linear relative movement vis-à-vis the second engagement member 4 when the first and the second engagement member are close together, while the upwards inclined second linear segment 20 of the control curve 18 results in the swivelling movement of the first engagement member 3 such that the half dome defined by the bell member 13 is rotated slightly downwards.

Figure 3:
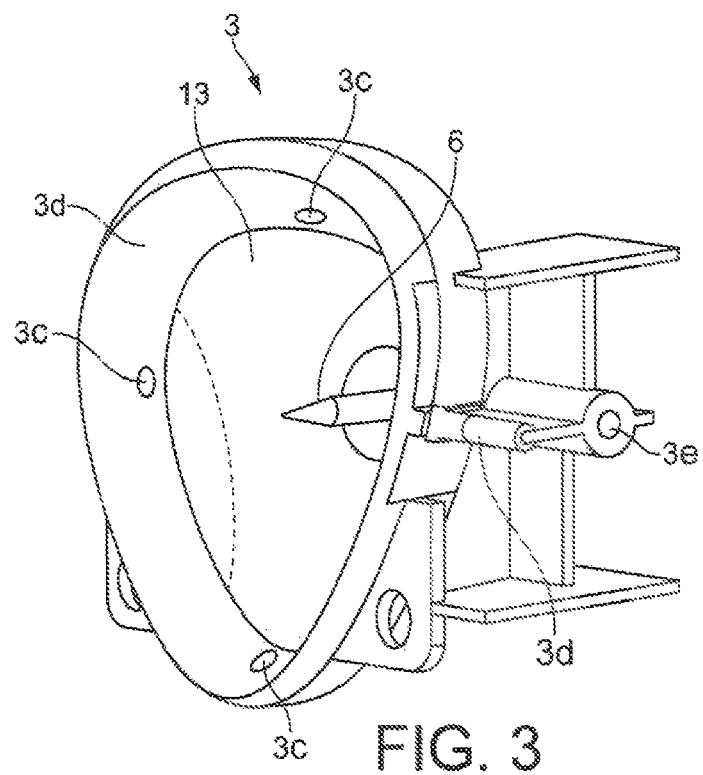
FIG. 3 illustrates a first capsule engagement member used in the system of the present invention.
Figure 4:
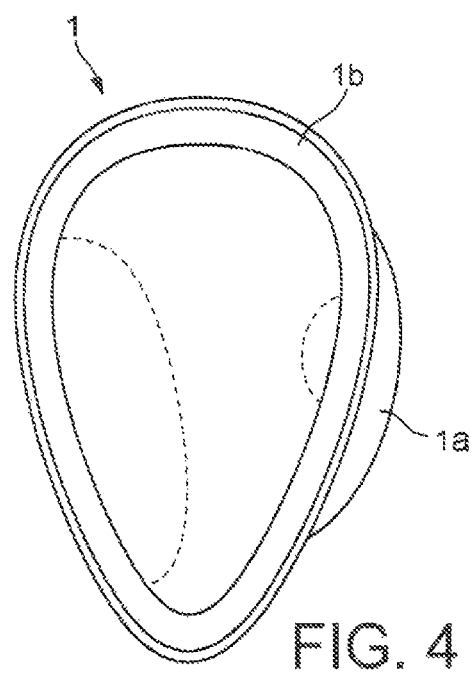
FIG. 4 illustrates a capsule used in the system of the present invention with the first capsule engagement member of FIG. 3.

FIG. 3 illustrates a first capsule engagement member 13 and FIG. 4 illustrates a capsule 1 able to be used with said first capsule engagement member according to the system of the present invention. The first engagement member 3 presents a hollow bell member 13. The capsule presents an enclosure outer shape 1a that is conformal to at least a portion of the hollow bell member 13. At the rear end of the first capsule engagement member 3 opening means of the capsule, usually a hollow needle 6, is fixed for piercing the capsule and injecting water. The first engagement member 3 also comprises retaining means able to exert frictions with discrete parts of the outer shape 1a of the enclosure of the capsule. These means can be discrete bumps 3c placed at different places of the first engagement member internal shape periphery. They can be supported by an annular seal 3d fixed on the edge of the hollow bell member 13. This seal can help at improving the engagement of the first second engagement member with the rim 1b of the capsule and avoiding leaking of water that could flow between the dome shaped member 13 and the external face of the capsule during the beverage production. The seal and the bumps are preferably made of a flexible and resilient material. Then the seal can then be flattened against the rim of the capsule during the beverage production step. The bumps 3c can deform themselves when the first engagement member engages the capsule. The fact that the bumps 3c are placed face to face on different sides of the internal face of the bell shape member 13 improves the way to retain the capsule and avoids that the latter falls from the first engagement member on the way to the capsule discharge position. The fact that the bumps 3c are placed on discrete places of the internal face of the bell shape member 13 avoids the risk that the capsule may stick to said internal face if the customer does not rapidly discharge the capsule after the beverage production. The seal and the bumps can be made of an elastomeric material, for example a silicone or an EPDM (ethylene propylene diene monomer) rubber. In FIG. 3, four bumps 3c are present positioned by pair on opposite side of the internal face of the hollow bell member 13. The bumps of the first pair are placed at the top and at the bottom of the internal face of the hollow bell member 13, whereas the bumps of the other pair are symmetrically opposed in view of the symmetrical vertical plane of the capsule or of the hollow bell member 13. Due to the fact that the capsule enclosure outer shape 1b is conformal to the hollow bell member 13 internal surface, the bumps 3c retain the capsule inside the first capsule engagement member when said member moves to the capsule discharge position.

Figure 5A:
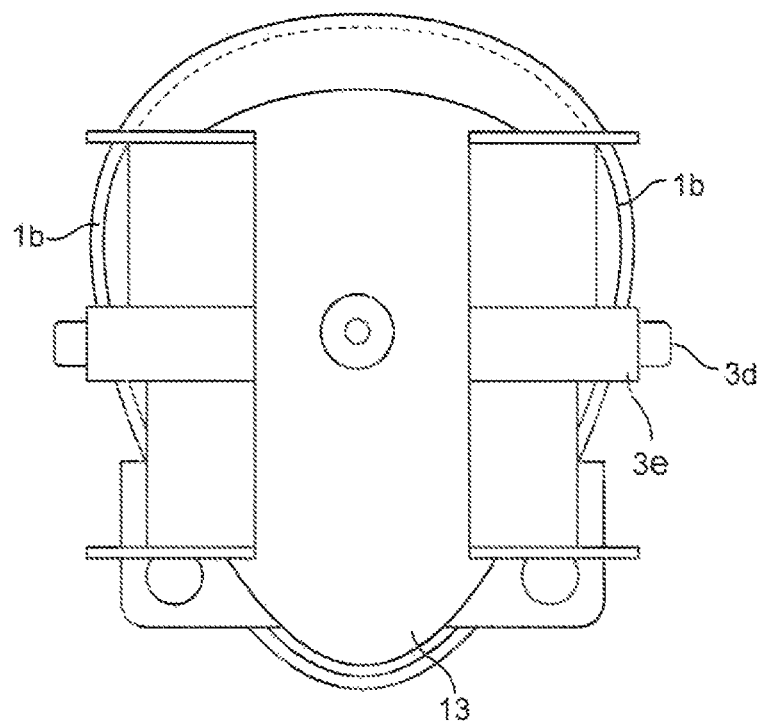
FIG. 5a is a back view of the first capsule engagement member of FIG. 3 with the capsule of FIG. 4 engaged inside and FIG. 5b is the corresponding front view.

The capsule 1 also comprises a size such that at least a part of its rim 1b extends beyond at least a part of the first capsule engagement member 3 once the capsule is engaged in the first capsule engagement member. FIG. 5a illustrates a back view of the first capsule engagement member 13 with the capsule 1 engaged in the hollow bell member 13. Some parts of the rim 1b of the capsule extend beyond the limits of the first capsule engagement member. It is preferable that at least a vertical part of the rim 1b extends beyond the limits of the first capsule engagement member. The term vertical is to be interpreted according to the position of the capsule inside the module.

The first capsule engagement member 3 also comprises means for coupling 3e said member to means of displacement and means 3d for cooperating with the pre-fixation means provided at a lateral side of the capsule cage and means 3d designed to engage with the rim 1b of the capsule for fixation of the capsule close to the second engagement member. In the present specification the term cage designates the hollow bell shaped member.

Figure 5B:
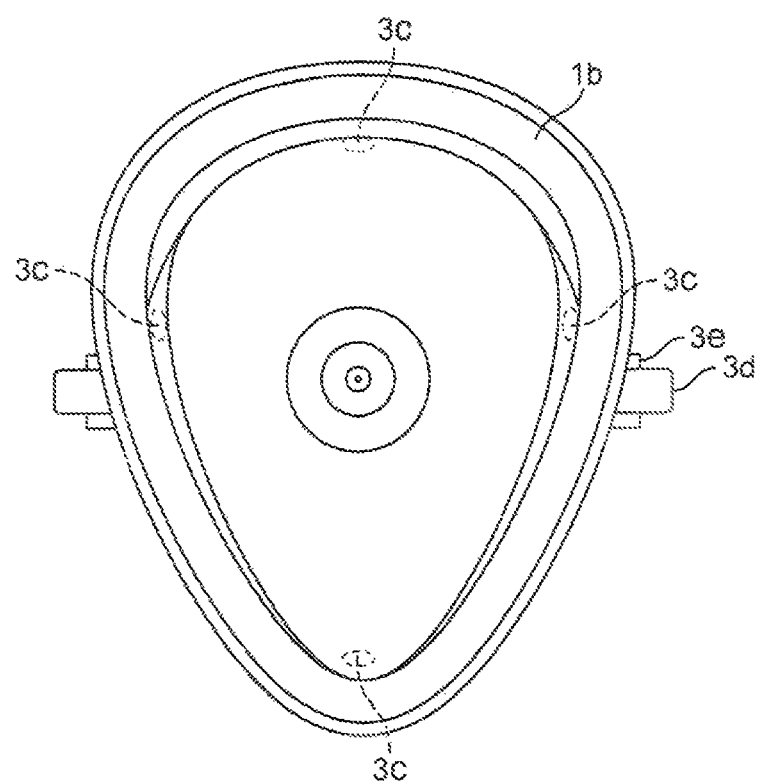

FIG. 5b illustrates a front view of the first capsule engagement member 13 and the capsule 1 engaged in the hollow bell member 13. The bumps 3c are illustrated in dotted points.

FIGS. 6a-6e illustrates the steps of introducing the capsule in the first and second engagement members 3, 4.

Figure 6A:
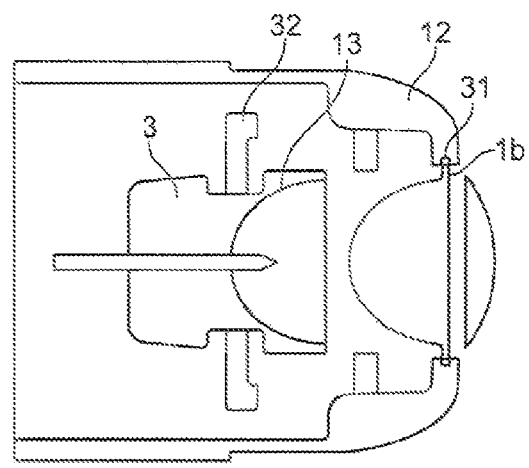
FIGS. 6a-6e illustrate the relative positions of first capsule engagement member, the capsule and the pre-fixation means during the movement of the first capsule engagement member during a cycle of beverage production according to a first embodiment.
Figure 6B:
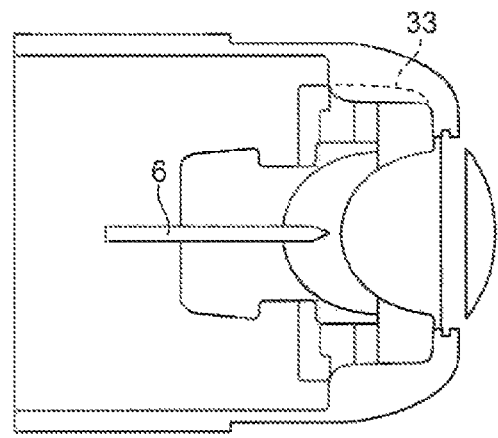
Figure 6C:
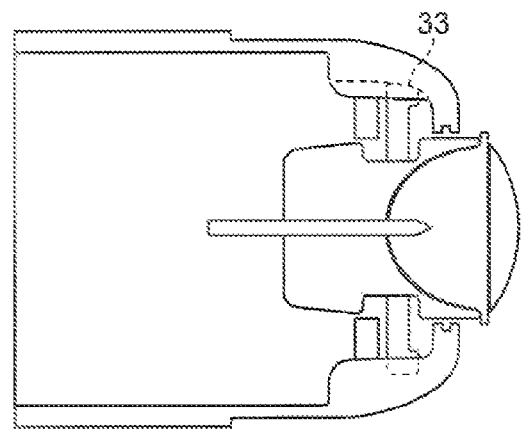

According to this aspect the capsule 1 is pre-positioned by pre-fixation means, such as for example flexible capsule pre-fixation arms 12. When seen from above the arms 12 are provided at the lateral sides of the capsule. The flexible arms 12 respectively present a vertical groove 31 made to engage with the rim 1b of the capsule 1. Therefore, when the capsule 1 is inserted manually by a user from the top of the beverage production module, it will be initially pre-positioned and held in place by the flexible arms 12. When the first engagement member 3 is made to approach the second engagement member 4, the prefixed arms 12 are moved away making the capsule 1 leave the pre-fixation position in the vertical grooves 31 and pushing the capsule 1 against the second engagement member as shown in FIG. 6c To this regard means can be provided to actively disengage the rim 1b of the capsule with the pre-fixation means (flexible arms) 12. As shown particularly in FIGS. 6b and 6c, the first engagement member 3 can be operatively connected to disengagement means 32 which cooperate with a slanted surface 33 of the flexible arms 12 in order to push the flexible arms 12 to the outside and thus to disengage the vertical grooves 31 of the flexible arms 12 from the rim 1b of the capsule. Thus, when the front surface of the bell-shaped member 13 of the first engagement member 3 is taking over the positioning of the capsule 1, the capsule 1 is made to be disengaged from the flexible arms 12 serving as pre-fixation means (FIG. 6c). In the beverage production position as shown in FIG. 6c, the rim of the capsule 1 is pushed behind the grooves 31 of the flexible arms 12.

Now, when after completion of the beverage production the first engagement member 3 is moved rearwards (from FIGS. 6c to 6d) and the capsule 1 is only held by a frictional engagement of the perforation member 6, the disengagement member 32 of the first engagement member 3 will again cooperate with specifically designed surfaces of flexible arms 12 in order to spread these arms 12 and thus have the capsule 1 pass these arms 12 without being engaged by the arms 12.

Figure 6D:
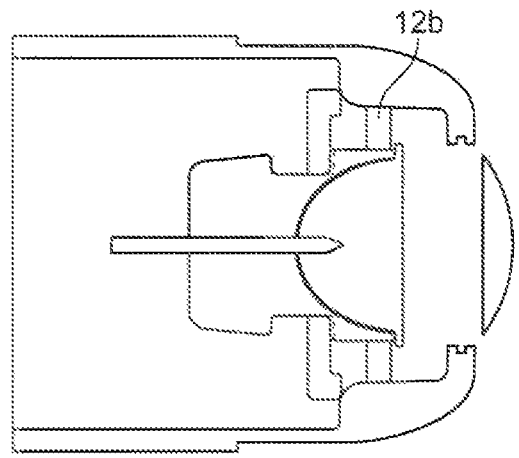
Figure 6E:
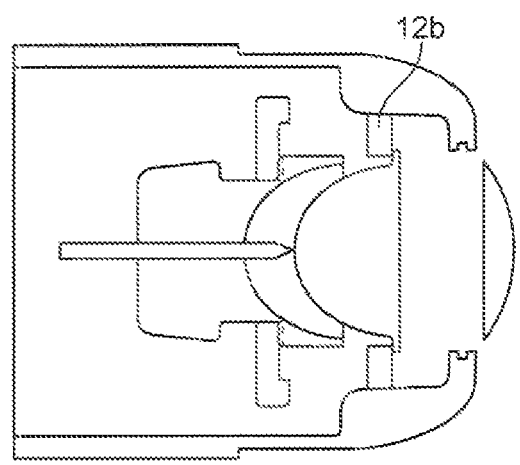
Figure 8:
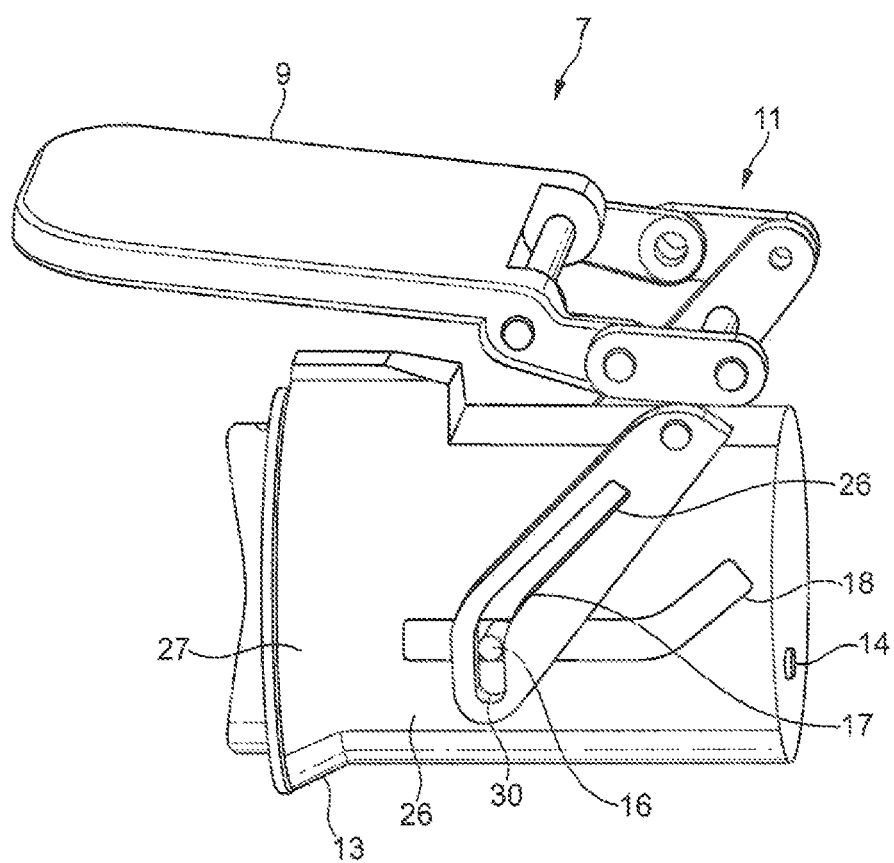
FIG. 8 shows an isolated view of the first engagement member and the means for displacing said member.

FIGS. 6d and 6e represent the intermediate position between the beverage production position and the capsule discharge position wherein tabs 12b retain the part of the capsule rim 1b extending beyond the capsule engagement member 3. These tabs can be fixed to the flexible arms 12 or other part of the module 3 or the beverage machine housing. FIG. 6e illustrates the position where the tabs 12b have retained the capsule rim 1b whereas the capsule engagement member 3 continues its return to the final position such as illustrated in FIG. 6a.

FIGS. 7a-7c illustrates the steps of disengaging the capsule from the first and second engagement members 3, 4, and discharging the capsule 1 according to another embodiment than the one illustrated in FIGS. 6a-6e. Each FIGS. 7a-7c presents a top and side view of the first engagement member 3, the capsule 1 and the pre-fixation arms 12. FIG. 7a relate to these elements placed in the beverage production position. In the precedent step of insertion of the capsule in the module and engagement of the capsule by the first and second capsule engagement members, the pre-fixation arms 12 were pushed away from the capsule rim 1b due to the engagement of the cooperating means 3d of the first capsule engagement member 3 with a slanted portion 12a of the pre-fixation means. The size of the rim 1b of the capsule is designed so as not be too large so as to enable the back movement of the capsule without engaging the pre-fixation arms.

FIG. 7b represent the intermediate position between the beverage production position and the capsule discharge position wherein tabs 12b fixed to a part of each of the flexible arms of the pre-fixation means 12 retain the part of the capsule rim extending beyond the capsule engagement member. These tabs can be fixed to other part of the module or the beverage machine housing. Preferably, the tabs are positioned to retain the capsule rim 1b where the opened face of the hollow bell member 13 is oriented downward.

FIG. 7c represent the final position of the capsule discharge position where the capsule 1 has been discharged from the first capsule engagement member by the two pairs of tabs 12b fixed each of the flexible arms of the pre-fixation means 12 and where the first capsule engagement member 3 finished its movement by a swivelling movement.

According to the system of the present invention the capsule must present a rim sufficiently large to be retained by the pre-fixation means and by the means for engaging the rim when the capsule is moved to the capsule discharge position, but not too large to be able to not be engaged by the pre-fixation means during the back movement to the capsule discharge position. The capsule must also present an enclosure external shape such that at least discrete parts of said enclosure are submitted to friction by the retaining means of the capsule cage when the capsule is engaged in the latter.

The invention claimed is:

1. A beverage production system comprising:
   a capsule; and
   a module for producing a beverage from the capsule:
   the capsule comprising an enclosure and a rim, and
   the module comprising:
   a first capsule engagement member, which can be displaced relative to a second, co-operating capsule engagement member between a capsule discharge position, in which the capsule is discharged from the first capsule engagement member, and a beverage production position,
   a retractor for actively retracting the first capsule engagement member from the beverage production position to the capsule discharge position which is offset relative to a beverage flow path,
   the displaceable first capsule engagement member comprising a member having the shape of a hollow bell,
   the capsule having an enclosure outer shape that conforms to at least a portion of the hollow bell shaped member and the capsule having a rim size such that at least a part of the rim of the capsule extends beyond at least a part of the first capsule engagement member once it is engaged in the first capsule engagement member,
   the displaceable first capsule engagement member comprises discrete bumps placed on an internal surface of the hollow bell member to create a friction with a discrete part of the outer shape of the enclosure of the capsule, and
   the module comprises an engagement for the rim of the capsule extending beyond the first capsule engagement member when the first capsule engagement member is displaced from the beverage production position to the capsule discharge position.

2. A beverage production system according to claim 1 wherein the module is designed for injecting water into a capsule and draining a beverage from the capsule while the capsule is in a beverage production position.

3. A beverage production system according to claim 1 wherein enclosure of the capsule is a cup-shaped housing having a shape selected from the group consisting of triangular, circular, ellipsoid, egg-shaped, square, rectangular and polygonal cross section.

4. A beverage production system according to claim 1 wherein the capsule comprises a cover and the module comprises an opener for opening the cover.

5. A beverage production system according to claim 1 wherein the discrete bumps are designed for engaging discrete parts of a periphery of the outer shape of the enclosure of the capsule.

6. A beverage production system according to claim 1 wherein the retractor for actively retracting the first capsule engagement member from the beverage production position to the capsule discharge position comprises a control curve including a first linear segment and a second linear segment inclined from the first linear segment for guiding the first capsule engagement member in a combination of a linear movement and a swivelling end movement.

7. A beverage production system according to claim 1 wherein the first capsule engagement member comprises an opener for piercing the capsule and injecting water in the capsule.

8. A beverage production system according to claim 1 wherein the module comprises a pre-fixation member which is provided at a lateral side of the capsule designed to engage with the rim of the capsule for fixation of the capsule close to the second engagement member.

9. A beverage production system according to claim 1, wherein the discrete bumps create a friction on an outer wall of the enclosure of the capsule.

* * * * *